May 25, 1965 L. LE BEAU 3,185,951

SLIP RING ASSEMBLY

Filed Feb. 20, 1962

INVENTOR.
LEE LEBEAU

BY

ATTORNEY

United States Patent Office 3,185,951
Patented May 25, 1965

1

3,185,951
SLIP RING ASSEMBLY
Lee Le Beau, 3120 Stanford Ave., Venice, Calif.
Filed Feb. 20, 1962, Ser. No. 174,606
7 Claims. (Cl. 339—5)

The present invention relates to slip ring assemblies and more particularly to a miniature type slip ring assembly incorporating numerous unique features and designed for manufacture to high tolerance specifications inexpensively and expeditiously.

The growing trend to manufacture precision instrumentation and electronic gear in ever smaller dimensions and lighter weight has confronted designers with serious manufacturing and assembly problems. These trends include the field of miniature gyroscopic instrumentation wherein there is a pressing demand for extremely small, lightweight and highly reliable slip ring assemblies mountable in axial alignment with rotating components of the gyroscope or the like instrumentation. Prior proposals advanced to meet these needs are characterized by their very high cost, the difficulty of assembling the components, the impracticability of attempting to disassemble them for inspection or servicing, and the lack of suitable provision for enclosing the brushes for pressurized operation or of means for preventing fouling of a mercury coating for certain of the metal parts. Other deficiencies and shortcomings include the lack of means for regulating and attaining the desired uniform light pressure between the brushes and the rotating hub unit; satisfactory provision for safeguarding against deflection of the brushes during assembly of the parts and the unintended movement of a brush onto an adjacent slip ring; the adverse effect of the brush pressure on the hub bearings and the frictional drag thereby imposed on the rotary protective yet simple, easily assembled and disassembled unit to which the hub is connected; and the lack of a fully fluid-tight protective housing for the slip ring rotor.

By the present invention the foregoing and other shortcomings of previously proposed slip ring assemblies are obviated in a highly satisfactory manner. The rotary component of the assembly is formed in one unit and includes a main body of molded dielectric material having a plurality of metallic slip rings arranged in axially spaced relation and preferably separated by annular dielectric barrier flanges. The lead wires for the slip rings are molded within the rotor core and extend axially from one end for connection to components rotating with this rotor. The rotor is preferably mounted in at least one anti-friction bearing and, in longer rotor units, in an anti-friction bearing at either of its ends. The outer raceways of these bearings have nesting support within a generally tubular main housing split longitudinally to permit it to be assembled laterally from the opposite sides of the radially-flanged rotor unit. In a preferred embodiment, the two housing halves are threaded at their opposite ends to receive threaded end caps effective to hold the housing parts rigidly and snugly assembled. One of the end caps includes a radial flange extending laterally beyond the housing proper and provided with mounting openings usable in anchoring the slip ring assembly to a suitable support.

An important feature concerns a unitary dielectric mounting for the brushes and comprising an insert bonded or molded to an opening in the side wall of one of housing halves and supporting therein a plurality of resilient brushes adapted to bear against the associated slip ring under a desired minute predetermined pressure. The outer ends of the brushes project from the exterior of the dielectric and are arranged in staggered relation to one another to provide solder terminals for lead wires. In a preferred design, each brush is of generally U-shape with the resilient legs arranged to straddle and to contact a slip ring at diametrically opposed points thereby avoiding loading the hub bearing or interfering with the highly critical dynamic balance of the rotating component to which the hub is rigidly secured in its operating environment.

The described housing can be operated under pressurized conditions which is highly advantageous and provides superior operating characteristics particularly at higher altitudes. Likewise, the sealing capabilities of the housing permit safe operation of the assembly in explosive atmospheres or while submerged in liquids.

Accordingly, it is a primary object of the present invention to provide an improved, simplified, low-cost precision slip ring assembly for use with gyroscopes and the like precision components of instrumentation.

Another object of the invention is the provision of a self-contained, enclosed miniature slip ring assembly so designed that there is adequate pressure contact between the brushes and the slip rings to assure positive and reliable electric contact without interfering with the dynamic balance of the rotor component.

Another object of the invention is the provision of a fully enclosed slip ring assembly for use with gyroscopes and the like highly sensitive instruments having its rotating component supported by anti-friction bearings and featuring an enclosing housing designed for assembly laterally from the opposite sides of the rotor and wherein the housing components are held in assembled relation by end caps.

Another object of the invention is the provision of a slip ring assembly having a rotor unit provided with radial barriers between adjacent slip rings and including a balanced brush assembly so designed as to be assembled to the rotor without risk of interfering with the delicately adjusted position of the brushes.

Another object of the invention is the provision of a simplified slip ring assembly having a multi-part housing adapted to be assembled and sealed about the rotor component and operated while internally pressurized as well as within an external atmosphere of potentially explosive constituents, or while submerged in oil or other liquids.

Another object of the invention is the provision of a slip ring assembly of the enclosed type and so constructed that either the core unit supporting the slip rings or the surrounding housing can be rotated in either direction relative to the other.

Another object of the invention is the provision of a miniature slip ring assembly constructed for use of mercury coatings on the brush and slip ring components without risk of the coatings becoming fouled, contaminated or lost.

These and other more specific objects will appear upon reading the following specification and claims and upon considering in connection therewith the attached drawings to which they relate.

Referring now to the drawings in which a preferred embodiment of the invention is illustrated.

Figure 1:
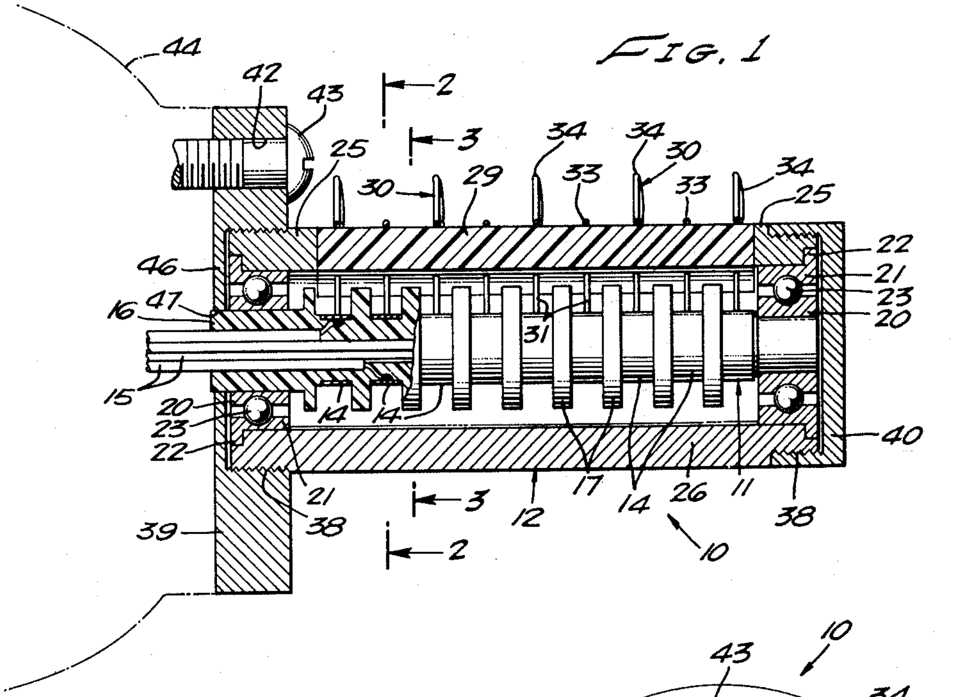
FIGURE 1 is a longitudinal sectional view through a preferred embodiment of the slip ring assembly incorporating the features of the present invention and shown on a greatly enlarged scale.

Referring more particularly to FIGURE 1, there is shown a totally enclosed hermetically sealed slip ring assembly designated generally 10 comprising as principal components a rotor unit 11 enclosed within a tubular housing 12. Rotor unit 11 may be of any suitable length necessary to accommodate the desired number of axially spaced metallic slip rings 14, 14, each having brazed, soldered or otherwise secured to its inner surface a separate insulated lead wire 15. Rings 14 are molded to a thermosetting plastic core 16 having molded integral therewith annular radially-disposed barrier flanges 17 separating the edges of adjacent slip rings from one another and effective to safeguard against the possibility of a brush associated with one slip ring becoming displaced and moved into contact with an adjacent slip ring.

As here shown, the opposite ends of rotor unit 11 are journaled in anti-friction ball bearing assemblies of any suitable type, the illustrated bearing units including an inner raceway ring 20 pressed over the opposite ends of the core. Outer raceway rings 21 are preferably provided with a positioning flange 22 seating in a complementally shaped recess in the ends of housing 12. Located between inner and outer rings 20, 21 are precision anti-friction balls 23. The inner raceway rings may be bonded to the contacting surfaces of rotor 11.

Figure 2:
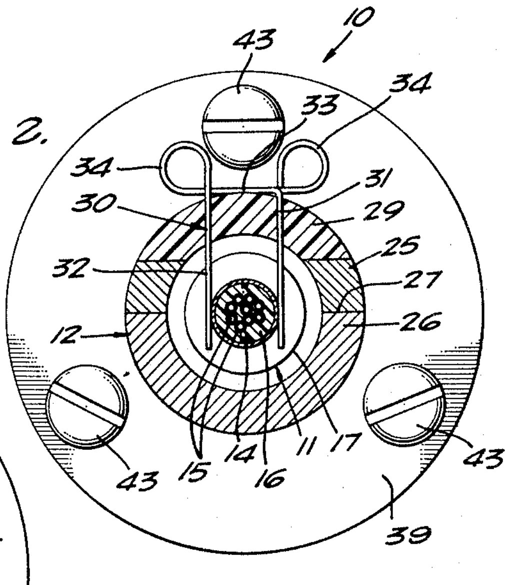
FIGURE 2 is a transverse sectional view taken along line 2—2 on FIGURE 1.
Figure 3:
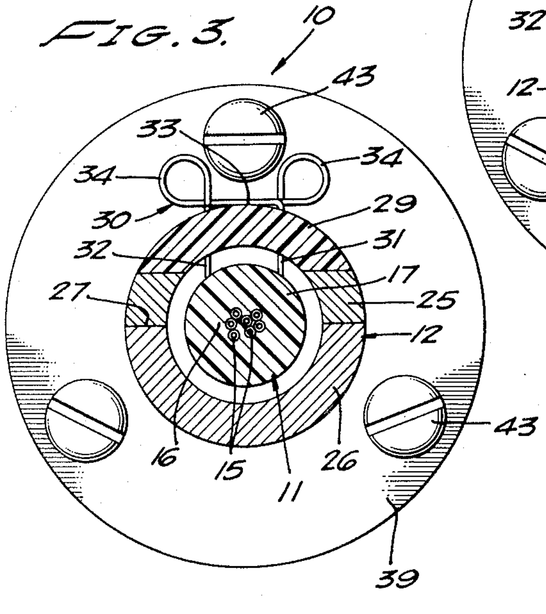
FIGURE 3 is a transverse sectional view taken along line 3—3 on FIGURE 1.

Referring now more particularly to FIGURES 2 and 3, it is pointed out that housing 12, as here shown, is formed in two semicylindrical halves 25, 26 of substantially identical configuration and having their edges 27 in contact along a longitudinal medial plane. As shown, halves 25, 26 are formed of metal in the interest of greater strength and rigidity. However, it will be understood that either or both may be formed of suitable rigid dielectric material if desired.

In cases where the housing halves are formed of metal, it is pointed out that half 25 is cut away for a major portion of its length and replaced with molded plastic material 29 firmly cemented or bonded to the edges of the cut-out and having its inner and outer surfaces conforming with the configuration of the similar surfaces of housing half 25.

Molded into the dielectric insert 29 is an individual set of brushes 30, there being one brush for each of the slip rings 14. The shape of the individual brushes 30 is best shown in FIGURE 2 from which it will be noted that each is formed in one piece from suitable high-conductivity spring material, such as fine wire, and are generally U-shaped in configuration. Thus, each brush comprises a pair of parallel legs 31, 32 joined by a bight portion 33 and including a loop 34 interconnecting leg 32 and the adjacent end of bight portion 33. Each brush is of identical configuration except that the loops 34 of adjacent brushes are preferably diagonally disposed from one another for maximum spacing and greater accessibility. Each loop 34 provides a convenient soldering lug or terminal for the conductors customarily attached to each brush.

As is made clear by FIGURE 2, the parallel legs 31, 32 of each brush straddle a given slip ring 14 and contact this ring at diametrically opposed points. Prior to assembly, the distance between brush legs 31, 32 is adjusted with precision so that it is less than the radial dimension of the slip ring and equally spaced from the housing axis. In consequence, upon assembly the brushes press against the associated slip ring under opposed equal predetermined minimum pressures requisite to assure reliable electrical contact. Owing to the fact that the required brush pressure imposed by each brush leg is exactly balanced by an equal and opposite pressure applied to the opposite side of the ring, it will be apparent that the required brush pressure is balanced throughout the length of the rotor unit. Accordingly, there is no tendency to urge the brush unit in any particular direction.

The opposite ends of each of the housing halves 25, 26 are provided with threads 38 mating with similar threads formed in each of end caps 39, 40. End cap 39 may be described as a large diameter ring the outer portion of which is provided with a suitable number of openings 42 to receive mounting screws or fasteners 43 employed to secure the slip ring assembly rigidly to either a stationary or a rotary member, the frame of a gyroscope indicated at 44 being typical. End cap 39 has a thin-walled central portion 46 formed with a central opening or aperture 47 having a loose fit with hub 11 and through which this hub and the slip ring leads 15 extend. As here shown, the second end cap 40 is generally cup-shaped and its inner side walls are provided with threads mating with housing threads 38. The rim edge of this end cap has a firm fit with the shoulder at the base end of thread 38. If desired, a gasket ring or an O-ring may be provided to seal the cap to the housing.

The assembly of the described components will be quite apparent from the foregoing detailed description of the structure. Rotor unit 11 is fabricated in suitable manner and the exterior surfaces of the slip rings 14 are accurately ground smooth and to uniform diameter. The bearing assemblies are then secured in place. Thereafter, the housing halves are assembled about the rotor. Before this operation is performed, the spacing between brush legs 31, 32 may be checked for alignment with one another and for the desired spacing between their inner ends at the point of contact with the slip rings.

Housing half 25 is then assembled laterally from one side of the rotor as the open ends of all legs 31, 32 are simultaneously placed astride their respective slip rings, the opposite inner wall of the half being pressed into seated engagement with outer raceway rings 21, 21. Thereafter, the second housing half 26 is similarly assembled from the opposite side following which the two halves are locked in assembled position by rotating end cap 40 downwardly over threads 38. Thereafter, the inner end cap 39 is assembled over the opposite end of the housing after the ends of lead wires 15 have been threaded through central aperture 47.

The completed slip ring assembly 10 is now ready to be mounted within its operating environment by means of mounting screws 43 which thread into the frame of a gyroscope or other component 44.

As will be readily observed from FIGURE 1, dielectric guard barriers 17 are interposed between adjacent slip rings as well as between the legs of adjacent brushes. Accordingly, it is impossible for any brush to become displaced and to contact an adjacent one of the slip rings.

If at any time inspection or servicing becomes desirable, access to the interior is gained by detaching mounting screws 43. End cap 39 can then be rotated to unthread it from the inner end of the housing without need for detaching any of the lead wires from the hub unit or from terminal lugs 34 of the brushes. Likewise, end cap 40 can be unscrewed permitting either or both halves of halves 25, 26 of the housing to be moved laterally away from the hub. Such disassembly does not risk displacement of the precise adjustment of the brushes either during the diassembly operation or the reassembly of these to the rotor unit 11. After the unit has been inspected and serviced, the parts are reassembled in the same manner described above and the assembly is returned to service without need for removing any lead wires.

Usually the assembly is intended for operation under pressure or other conditions wherein it is desirable that housing 12 be permanently seated. In these circumstances the mating edges of housing halves may be coated with a suitable sealant, as epoxy, or the like, and threads 38 of the end caps may have a similar sealant applied prior to assembly. Care is of course exercised to apply the sealant evenly without excess. Also it is desirable to apply the sealant between the contacting sufaces of end cap 39 and member 44 to which it is secured. It will be understood that when the assembly is so treated, it may be operated under pressure as well as submerged in liquid, gas or an explosive atmosphere without risk of leakage between the external and internal environments. Likewise the coating of mercury preferably present on the slip rings and brushes is protected against loss and contamination. It will be recognized that disassembly for inspection and repair is not feasible if the housing components have been hermetically sealed. In such cases, any defect is remedied only by replacement of the defective assembly with a good one.

Although the unit supporting the slip ring has been referred to above as the rotor, it is to be understood that either the housing or unit 11 may be properly called the rotor depending on which is secured to the rotary member in the operating environment.

While the particular slip ring assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A unitary fully enclosed miniature slip ring assembly for use with gyroscopes and the like rotary devices, said assembly comprising a rotor assembly of dielectric material having bonded thereto a plurality of metallic slip rings each connected to an insulated lead wire extending lengthwise through said rotor assembly, housing means fully enclosing said rotor assembly and formed in a plurality of parts designed for assembly laterally toward said rotor assembly from the opposite sides thereof, at least one of said housing parts having electrically conductive brushes extending through and sealed to the walls thereof with their bifurcated inner ends positioned to engage an associated one of said slip rings from the diametrically opposed sides thereof, bearing means between said rotor assembly and said housing parts, means embracing the opposite ends of said housing parts to hold the parts thereof snugly assembled said brushes each comprising a single length of small-diameter resilient material having a generally U-shaped configuration to provide a pair of parallel legs straddling said rings and lightly spring pressed against the diametrically opposed sides thereof under substantially identical predetermined pressures, and the junction of one leg and the bight portion of said brushes including a small loop providing a soldering terminal for said brushes lying closely adjacent the exterior side wall of said housing, and said soldering terminals of adjacent ones of said brushes being at the opposite ends of said bight portions so as to be staggered and arranged in two parallel rows along one side of said housing.

2. A slip ring assembly as defined in claim 1 characterized in that said metallic slip rings are separated from one another by radial flanges of said dielectric material providing guard barriers maintaining individual ones of said brushes captive on an associated one of said slip rings.

3. An article of manufacture comprising a tubular housing adapted to be assembled over and to provide an enclosing support for a slip ring rotor unit, said article of manufacture being formed in two semicylindrical halves interfitting generally along the median longitudinal plane of said housing and having threaded ends separate, threaded end caps engageable one with a respective one of said threaded ends to hold said halves snugly assembled together, and a plurality of electrically conductive brushes extending through said housing and electrically insulated from one another, each of said brushes being formed in one piece of resilient material and having an inner end positioned to contact a slip ring when said housing is assembled about a slip ring rotor unit and the outer end providing a soldering terminal for a lead wire.

4. An article of manufacture as defined in claim 3 characterized in that each of said brushes includes a pair of resilient inner ends normally spaced apart by a distance less than the diameter of the slip ring surface with which the brush is intended to be used and being adapted to be assembled to a slip ring supporting rotor from one lateral side of the ring.

5. An article of manufacture as defined in claim 4 characterized in that one of said end cap means projects laterally from said housing and includes means for rigidly attaching said housing to a supporting structure.

6. An article of manufacture as defined in claim 4 in that said housing halves each include bodies formed of metallic material and one of which includes an insert of dielectric material bonded to said metallic material and directly supporting said brushes.

7. A unitary fully enclosed miniature slip ring assembly for use with gyroscopes and the like rotary devices, said assembly comprising a rotor assembly of dielectric material having bonded thereto a plurality of metallic slip rings each connected to an insulated lead wire extending lengthwise through said rotor assembly, housing means fully enclosing said rotor assembly and formed in a plurality of parts designed for assembly laterally toward said rotor assembly from the opposite sides thereof, at least one of said housing parts having electrically conductive brushes extending through and sealed to the walls thereof with their bifurcated inner ends positioned to engage an associated one of said slip rings from the diametrically opposed sides thereof, bearing means between said rotor assembly and said housing parts, means embracing the opposite ends of said housing parts to hold the parts thereof snugly assembled, including a cup-shaped end cap held tightly closed over one end of said rotor assembly and a radially flanged end cap threaded over the other end of said housing with the lead wires for said rotor extending axially beyond the body thereof, said flanged end cap having means thereon to facilitate rigidly anchoring said slip ring assembly to support means therefor, said housing being formed in two semicylindrical halves, and the opposite ends of said halves being threaded to mate with correspondingly threaded portions of said end caps and being held snugly in assembled position thereby.

References Cited by the Examiner

UNITED STATES PATENTS

| | | | |
|---|---|---|---|
| 2,343,546 | 3/44 | Fuge et al. | 310—244 |
| 2,471,808 | 5/49 | Baker | 310—232 |
| 2,473,526 | 6/49 | Hood et al. | 339—5 |
| 2,521,822 | 9/50 | Boswell | 339—89 X |
| 2,658,184 | 11/53 | Greenbaum | 339—99 |
| 2,752,514 | 6/56 | Schwenden | 310—255 X |
| 2,877,435 | 3/59 | Alvine | 339—5 |
| 2,879,490 | 3/59 | Campbell et al. | 339—5 |
| 2,924,800 | 2/60 | Scarborough | 339—48 |
| 2,946,033 | 7/60 | Wirth | 339—17 |
| 2,963,677 | 12/60 | Kallenborn | 339—48 X |

JOSEPH D. SEERS, *Primary Examiner.*

ALFRED S. TRASK, *Examiner.*